(12) United States Patent
Su

(10) Patent No.: US 8,433,287 B2
(45) Date of Patent: Apr. 30, 2013

(54) FEMTOCELL AUTHENTICATION SYSTEM AND AUTHENTICATION METHOD EMPLOYING THE SAME

(75) Inventor: Jen-Chen Su, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/181,457

(22) Filed: Jul. 12, 2011

(65) Prior Publication Data

US 2012/0244838 A1 Sep. 27, 2012

(30) Foreign Application Priority Data

Mar. 21, 2011 (CN) .......................... 2011 1 0067204

(51) Int. Cl.
*H04W 12/06* (2009.01)

(52) U.S. Cl.
USPC ........................................ 455/411; 455/456.1

(58) Field of Classification Search .................. 455/411, 455/456.5, 456.1, 426.2, 450, 446, 410, 571, 455/406; 370/338, 328, 332, 331, 252, 241, 370/230.1

See application file for complete search history.

(56) References Cited

U.S. PATENT DOCUMENTS

| | | | |
|---|---|---|---|
| 2008/0299992 A1* | 12/2008 | Eitan et al. .................. | 455/456.5 |
| 2009/0086742 A1* | 4/2009 | Ghai et al. .................... | 370/401 |
| 2009/0111427 A1* | 4/2009 | Mack et al. ................... | 455/411 |
| 2009/0227234 A1* | 9/2009 | Bosch et al. .................. | 455/411 |
| 2010/0240397 A1* | 9/2010 | Buchmayer et al. ....... | 455/456.1 |

\* cited by examiner

*Primary Examiner* — Kiet Doan
(74) *Attorney, Agent, or Firm* — Altis Law Group, Inc.

(57) ABSTRACT

A femtocell authentication system includes a femtocell in communication with an Internet protocol multimedia subsystem (IMS) network. The IMS network includes a gateway and a first server. The femtocell includes a global positioning system (GPS) module to obtain geolocation information of the femtocell and transmit the geolocation information to the first server. The first server includes a storage unit and a signal processing unit, the signal processing unit compares the geolocation information with a predetermined geolocation range value in the storage unit and allows the femtocell access to the IMS network according to a determination by the signal processing unit that the femtocell is within the predetermined geolocation range of the IMS network.

13 Claims, 3 Drawing Sheets

FEMTOCELL AUTHENTICATION SYSTEM AND AUTHENTICATION METHOD EMPLOYING THE SAME

BACKGROUND

1. Technical Field

The disclosure generally relates to telecommunications, and more particularly to a femtocell authentication system and an authentication method employing the same.

2. Description of the Related Art

A femtocell is a small cellular base station usually designed for use in a home or small business and connects to a service provider's network via broadband (e.g., cable). The femtocell allows the service providers to extend service coverage indoors, especially where access would otherwise be limited or unavailable.

A femtocell can access and establish communication with an Internet protocol multimedia subsystem (IMS) through femtocell access point (AP). The arrangement and location of the femtocell is generally controlled by the IMS. However, when the femtocell is removed, the femtocell AP is unavailable for the femtocell. Thus, the femtocell is inaccessible to establish communication with the IMS.

Therefore, there is room for improvement within the art.

BRIEF DESCRIPTION OF THE DRAWINGS

Many aspects of a femtocell authentication system and an authentication method employing the same can be better understood with reference to the following drawings. The components in the drawings are not necessarily drawn to scale, the emphasis instead being placed upon clearly illustrating the principles of the femtocell authentication system and the authentication method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
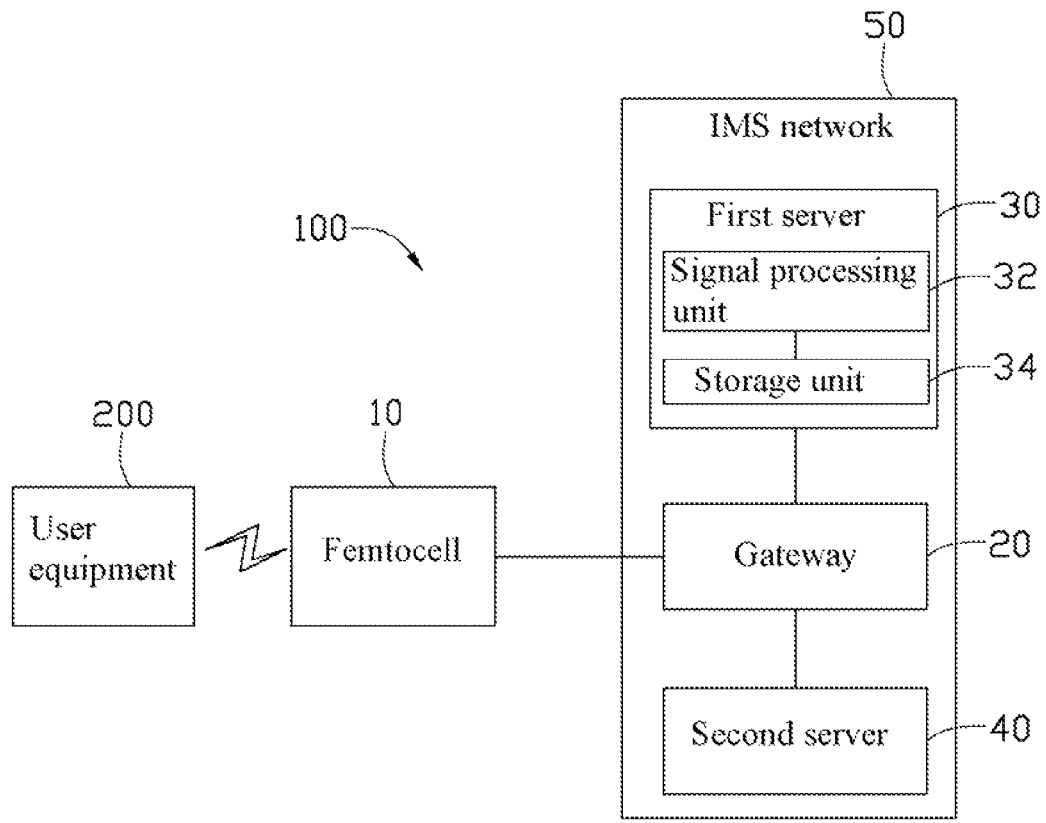
FIG. 1 is a block view of one embodiment of a femtocell authentication system including a femtocell of the disclosure.

FIG. 1 shows a block view of one embodiment of a femtocell authentication system 100 including a femtocell 10 of the disclosure. The femtocell authentication system 100 further includes a gateway 20, a first server 30, and a second server 40.

In this embodiment, the femtocell 10 communicates with the gateway 20 via a wireless network or a wired connection to establish communication connection. The gateway 20 is further in electronic communication with the first server 30 and the second server 40, forming an Internet protocol multimedia subsystem (IMS) network 50. Furthermore, the femtocell 10 is in electronic communication with at least user equipment 200 via a wireless network, such as wireless regional area network (WRAN). The user equipment 200 can be a mobile phone or other mobile communication terminals.

Figure 2:
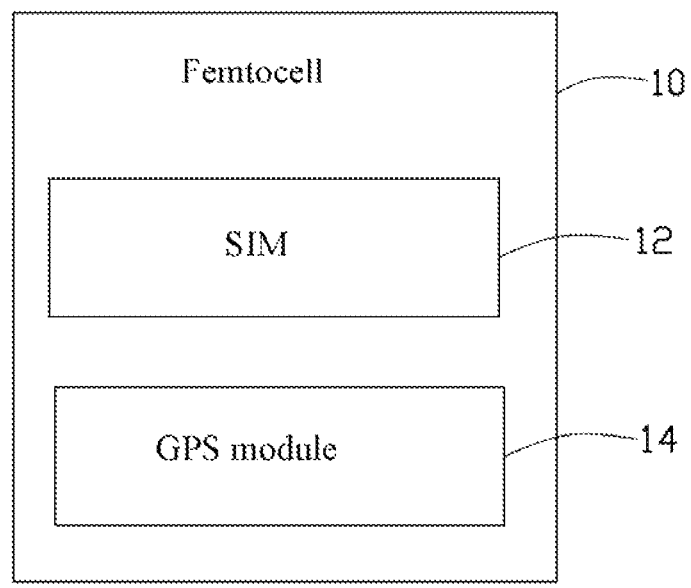
FIG. 2 is a block view of the femtocell shown in FIG. 1 of the disclosure.

Referring to FIG. 2, the femtocell 10 is configured for use in a home or small business and connects to the service provider's network via broadband, such as a wired connection (e.g. a cable connection), and further allows the service provider to extend their service coverage indoors, especially where access would otherwise be limited or unavailable. In this embodiment, the femtocell 10 includes a subscriber identity module (SIM) 12. The SIM 12 is an integrated circuit that stores a group of identification (ID) information used to identify a subscriber on mobile telephony devices (such as mobile phones and computers). The ID information can be a group of International mobile subscriber identification (IMSI) numbers.

The femtocell 10 further includes a Global Positioning System (GPS) module 14 in electronic communication with the SIM 12. The GPS module 14 can be a GPS receiver or a GPS navigation device, and includes a radio frequency microchip, a baseband microchip, a core CPU and peripheral circuits, and is capable of providing location and time information. In this embodiment, the GPS module 14 is capable of obtaining and receiving geolocation information of the femtocell 10. In detail, the femtocell 10 transmits an Internet key exchange (IKE) packet including the ID information and the geolocation information of the femtocell 10 to the first server 30 through the gateway 20. Thus, the first server 30 authenticates and determines whether the femtocell 10 can access and communicate with the IMS network 50 using the ID information and the geolocation information.

In this embodiment, the gateway 20 can be a packet data gateway and is used as a protocol converter to provide protocol servers such as protocol conversion, routing and data exchange for the communication between the femtocell 10 and the IMS network 50.

In this embodiment, the first server 30 is an authentication authorization and accounting (AAA) server, and includes a signal processing unit 32 and a storage unit 34. The signal processing unit 32 can be a central processing unit (CPU) and carries out the functions of the first server 30. The storage unit 34 is electrically connected to the signal processing unit 32 and can be a programmable read-only memory, a flash or other memory devices. In this embodiment, the storage unit 34 is capable of prestoring corresponding predetermined geolocation range values.

The first server 30 receives the IKE packet from the femtocell 10 via the gateway 20, and verifies and authenticates the ID information in the IKE packet to determine whether the femtocell 10 is applicable to the IMS network 50. In this embodiment, when the first server 30 receives the geolocation information in the IKE packet, the signal processing unit 32 compares the received geolocation information with the predetermined geolocation range values of the storage unit 34 and determines whether the geolocation of the femtocell 10 is within the prestored geolocation range of the IMS network 50. When both the ID information and the geolocation information of the femtocell 10 are validated and pass through authentication of the first server 30, the storage unit 34 of the first server 30 then stores the geolocation information of the femtocell 10, and the signal processing unit 32 feedbacks a validated authentication message to the femtocell 10 via the gateway 20.

The second server 40 is capable of allowing the femtocell 10 to access to and connect the IMS network 50. In this embodiment, the second server 40 can be an IMS server. A session initiation protocol is used to implement the network registration.

Figure 3:
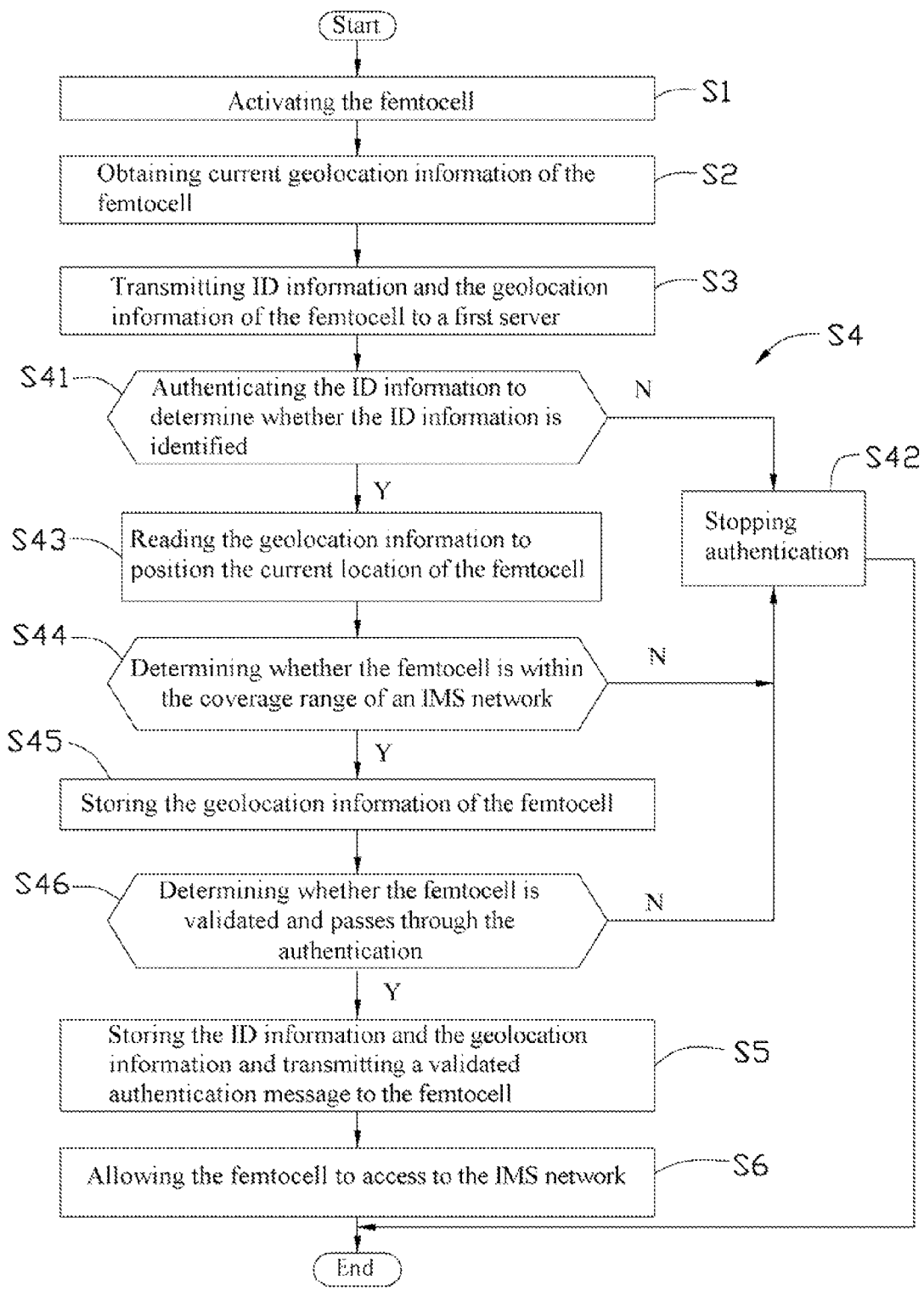
FIG. 3 is a flowchart of an authentication method, according to an embodiment of the disclosure.

Also referring to FIG. 3, an authentication method for allowing the femtocell 10 to access to the IMS network 50 according to an embodiment of the disclosure is depicted. The authentication method can use the aforementioned femtocell authentication system 100, and may include at least the following steps.

In step S1, the femtocell 10 is enabled and powered on, and the SIM 12 restores a group of ID information of the femtocell 10 and is activated.

In step S2, the GPS module 14 of the femtocell 10 positions and obtains the current geolocation information of the femtocell 10.

In step S3, the femtocell 10 transmits the IKE packet including the geolocation information in the GPS module 14 and the ID information in the SIM 12 to the first server 30 through the gateway 12.

In step S4, the first server 30 receives and authenticates the IKE packet from the femtocell 10. The step S4 may include at least the following sub-steps.

In step S41, the signal processing unit 32 of the first server 30 reads and authenticates the ID information in the IKE packet to determine whether the ID information of the femtocell 10 is identified by the IMS network 50. If the ID information of the femtocell 10 meets the requirement, that is, the ID information of the femtocell 10 is identifies, then the method proceeds to step S43; if the ID information of the femtocell 10 fails to meet the requirement, that is, the ID information of the femtocell 10 is not identifies by the IMS network 50, then the method proceeds to step S42.

In step S42, the signal processing unit 32 stops receiving IKE packet and finishes EAP-AKA authentication to prevent the femtocell 10 from accessing to the IMS network 50.

In step S43, the signal processing unit 32 of the first server 30 reads and obtains the geolocation information in the IKE packet to position the current location of the femtocell 10.

In step S44, the signal processing unit 32 compares the received geolocation information of the femtocell 10 with the predetermined geolocation range values prestored in the storage unit 34 of the first server 30 to determine whether the femtocell 10 is within the coverage range of the IMS network 50. If the geolocation information of the femtocell 10 is within the geolocation range of the IMS network 50, that is, the femtocell 10 is within the coverage range of the IMS network 50, then the method proceeds to step S45. If the geolocation information exceeds the geolocation range of the IMS network 50, that is, the femtocell 10 is unable to obtain accessible services from the IMS network 50, and then step S42 is repeated.

In step S45, the storage unit 34 of the first server 30 stores the current geolocation information of the femtocell 10.

In step S46, the signal processing unit 32 of the first server 30 determines whether the EAP-AKA is validated and passes through the authentication. If the EAP-AKA is validated and passes through the authentication, then the method proceeds to step S5; if the EAP-AKA is invalidated and fails to pass through the authentication, then the method proceeds to step S42.

In step S5, the storage unit 34 stores the IKE packet including the geolocation information and the ID information of the femtocell 10 and feedbacks a validated authentication message to the femtocell 10 through the gateway 20.

In step S6, the second server 40 allows the femtocell 10 to finish registration and access to the IMS network 50.

Moreover, in this embodiment, the authentication sequence in step S4 is not limited from ID information authentication to geolocation information authentication, and it can be the opposite processes. For example, the geolocation information can be firstly obtained and verified to position the current location of the femtocell 10 in steps S43 to S45, and then the ID information is accordingly verified by the signal processing unit 32 in step S41 after the geolocation information.

In summary, in the femtocell authentication system 100 of the disclosure, the GPS module 14 built in the femtocell 10 can position and obtain the current geolocation information of the femtocell 10. The first server 30 authenticates and compares the geolocation information with the predetermined geolocation range values to determine whether the femtocell 10 is within the coverage range of the IMS network 50. When the femtocell 10 is within the coverage range of the IMS network 50, the femtocell 10 is validated and passes through authentication of the first server 30 and further accesses to the IMS network 50, avoiding invalidated registration. Thus, the femtocell authentication system 100 can help Internet service providers to manage the femtocell 10, and arrange and construct different IMS networks.

In the present specification and claims, the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A first server in electronic communication with a gateway to form an Internet protocol multimedia subsystem (IMS) network, wherein the first server is in electronic communication with a femtocell, the femtocell comprising a Global Positioning System (GPS) module that obtains geolocation information of the femtocell and transmits the geolocation information to the first server, the first server, comprising:
   a storage unit that stores a predetermined geolocation range value; and
   a signal processing unit that compares the geolocation information with the predetermined geolocation range value and allows the femtocell access to the IMS network according to a determination by the signal processing unit that the femtocell is within the predetermined geolocation range;
   a second server in electronic communication with the gateway, the second server allows the femtocell to complete network registration and further allows the femtocell to access to and connect the IMS network;
   wherein the femtocell further comprises a subscriber identity module (SIM) in electronic communication with the GPS module, the SIM stores a group of identification (ID) information, and the signal processing unit verifies and authenticates the ID information of the femtocell to determine whether the femtocell is applicable to the IMS network, the IMS network comprises a second server in electronic communication with the gateway, the second server allows the femtocell to complete network registration and further allows the femtocell to access to and connect the IMS network; and
   wherein the gateway is a packet data gateway and is used as a protocol converter to provide protocol conversion, routing data exchange and other protocol servers for the communication between the IMS network and the femtocell.

2. The first server as claimed in claim 1, wherein the geolocation information and the ID information of the femtocell is stored in an Internet key exchange (IKE) packet, and the IKE packet is transmitted between the femtocell and the first server through the gateway.

3. The first server as claimed in claim 1, wherein when the ID information and the geolocation of the femtocell are validated and passed through authentication of the first server, the storage unit of the first server stores the geolocation information of the femtocell and feedbacks a validated authentication message to the femtocell via the gateway.

4. The first server as claimed in claim 1, wherein the first server is an authentication authorization and accounting server and the second server is an IMS server, and the ID information is a group of International mobile subscriber identification numbers.

5. The first server as claimed in claim 1, wherein the first server supplies network authentication for the femtocell and the network authentication is implemented based on extensible authentication protocol-authentication and key agreement.

6. A first server in electronic communication with a gateway, and in electronic communication with a second server and a femtocell through the gateway, wherein the gateway, the first server and the second server form an Internet protocol multimedia subsystem (IMS) network, the femtocell comprising a Global Positioning System (GPS) module for obtaining geolocation information of the femtocell and transmitting the geolocation information to the first server, the first server comprising:

a storage unit that prestores a predetermined geolocation range value; and a signal processing unit electrically connected to the storage unit, wherein the signal processing unit compares the geolocation information with the predetermined geolocation range value and allows the femtocell access to and establish communication with the IMS network according to a determination by the signal processing unit that the femtocell is within a coverage range of the IMS network;

wherein the femtocell further comprises a subscriber identity module (SIM) in electronic communication with the GPS module, the SIM stores a group of identification (ID) information, and the signal processing unit of the first server verifies and authenticates the ID information of the femtocell to determine whether the femtocell is applicable to the IMS network, the second server allows the femtocell to complete network registration and further allows the femtocell to access to and connect the IMS network; and wherein the gateway is a packet data gateway and is used as a protocol converter to provide protocol conversion, routing data exchange and other protocol servers for the communication between the IMS network and the femtocell.

7. The first server as claimed in claim 6, wherein the geolocation information and the ID information of the femtocell is stored in an Internet key exchange (IKE) packet, and the IKE packet is transmitted between the femtocell and the first server through the gateway.

8. The first server as claimed in claim 6, wherein when the ID information and the geolocation of the femtocell are validated and passed through authentication of the first server, the storage unit stores the geolocation information of the femtocell and feedbacks a validated authentication message to the femtocell via the gateway.

9. The first server as claimed in claim 6, wherein the first server is an authentication authorization and accounting server and the second server is an IMS server, and the ID information is a group of International mobile subscriber identification numbers.

10. The first server as claimed in claim 6, wherein the first server supplies network authentication for the femtocell and the network authentication is implemented based on extensible authentication protocol-authentication and key agreement.

11. An authentication method for allowing a femtocell to access to an Internet protocol multimedia subsystem (IMS) network, the authentication method comprising steps of:

obtaining current geolocation information of the femtocell;

transmitting the geolocation information of the femtocell to a first server of the IMS network;

comparing the geolocation information of the femtocell with a predetermined geolocation range value prestored in a storage unit of the first server to determine whether the femtocell is within the coverage range of the IMS network;

stopping authenticating the femtocell if the geolocation information is without the geolocation range of the IMS network;

storing the geolocation information of the femtocell if the geolocation information is within the coverage range of the IMS network;

enabling the femtocell to pass the authentication and access to the IMS network; and allowing the femtocell to access to the IMS network by the signal processing unit.

12. The authentication method as claimed in claim 11, further comprising activating the femtocell.

13. The authentication method as claimed in claim 11, further comprising storing the geolocation information and transmitting a corresponding validated authentication message to the femtocell.

* * * * *